United States Patent
Rodecker

(10) Patent No.: US 10,030,569 B2
(45) Date of Patent: Jul. 24, 2018

(54) SOCKET ISOLATOR MOUNTING APPARATUS

(71) Applicant: The Pullman Company, Milan, OH (US)

(72) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 6 days.

(21) Appl. No.: 15/481,765

(22) Filed: Apr. 7, 2017

(65) Prior Publication Data

US 2017/0211458 A1 Jul. 27, 2017

Related U.S. Application Data

(63) Continuation of application No. 14/678,377, filed on Apr. 3, 2015, now Pat. No. 9,650,939.

(60) Provisional application No. 62/046,418, filed on Sep. 5, 2014.

(51) Int. Cl.

| | |
|---|---|
| *F16M 1/00* | (2006.01) |
| *F01N 13/18* | (2010.01) |
| *F16L 55/035* | (2006.01) |
| *B60K 13/04* | (2006.01) |
| *F01N 13/08* | (2010.01) |

(52) U.S. Cl.
CPC .......... *F01N 13/1822* (2013.01); *B60K 13/04* (2013.01); *F16L 55/035* (2013.01); *F01N 13/08* (2013.01); *F01N 13/1805* (2013.01)

(58) Field of Classification Search
CPC ............. F01N 13/1822; F01N 13/1816; F01N 13/1811; F01N 13/1805; F01N 2340/04; F01N 13/08; B60K 13/04; B60K 5/1208; B60K 5/1216; B60K 5/1225; B60K 5/1233; B60K 5/1283; B60K 13/06; B60K 5/12; F16L 55/035
USPC .......... 248/635; 267/294; 180/309, 296, 89.2
See application file for complete search history.

(56) References Cited

U.S. PATENT DOCUMENTS

| | | | |
|---|---|---|---|
| 2,227,306 A * | 12/1940 | Guy ................... | F01N 13/1822 248/613 |
| 2,925,972 A * | 2/1960 | Sullivan ............... | B60K 5/1216 248/569 |
| 2,925,973 A * | 2/1960 | Aebersold ........... | B60K 5/1216 248/569 |
| 5,398,907 A | 3/1995 | Kelchner | |
| 9,689,521 B2 * | 6/2017 | Noll ....................... | B60K 13/04 |
| 2003/0155169 A1 | 8/2003 | Kromis et al. | |
| 2003/0160136 A1 * | 8/2003 | Kato ...................... | B60K 13/04 248/58 |

(Continued)

*Primary Examiner* — Christopher Garft
(74) *Attorney, Agent, or Firm* — Harness, Dickey & Pierce, P.L.C.

(57) ABSTRACT

An isolator mounting apparatus for supporting an exhaust component from a body portion of a vehicle via a hanger comprises an elastomeric isolator element having at least one aperture for receiving a portion of the hanger. An isolator bracket for receiving and supporting the isolator element includes a neck portion extending therefrom. A mounting element includes a pair of flanges. The flanges are secured to the isolator bracket with a fastener extending along longitudinal axis. The flanges engage the neck portion and prevent rotation of the isolator bracket about the longitudinal axis.

17 Claims, 11 Drawing Sheets

(56) References Cited

U.S. PATENT DOCUMENTS

| | | | | |
|---|---|---|---|---|
| 2004/0262460 A1* | 12/2004 | Molnar | ............. | B60K 13/04 |
| | | | | 248/60 |
| 2005/0184201 A1* | 8/2005 | Komitsu | ............. | B60K 13/04 |
| | | | | 248/58 |
| 2012/0091639 A1* | 4/2012 | Lee | ............. | B60K 5/1216 |
| | | | | 267/140.11 |
| 2012/0292478 A1 | 11/2012 | Uhlenbruch | | |
| 2013/0075965 A1 | 3/2013 | Rodecker | | |

* cited by examiner

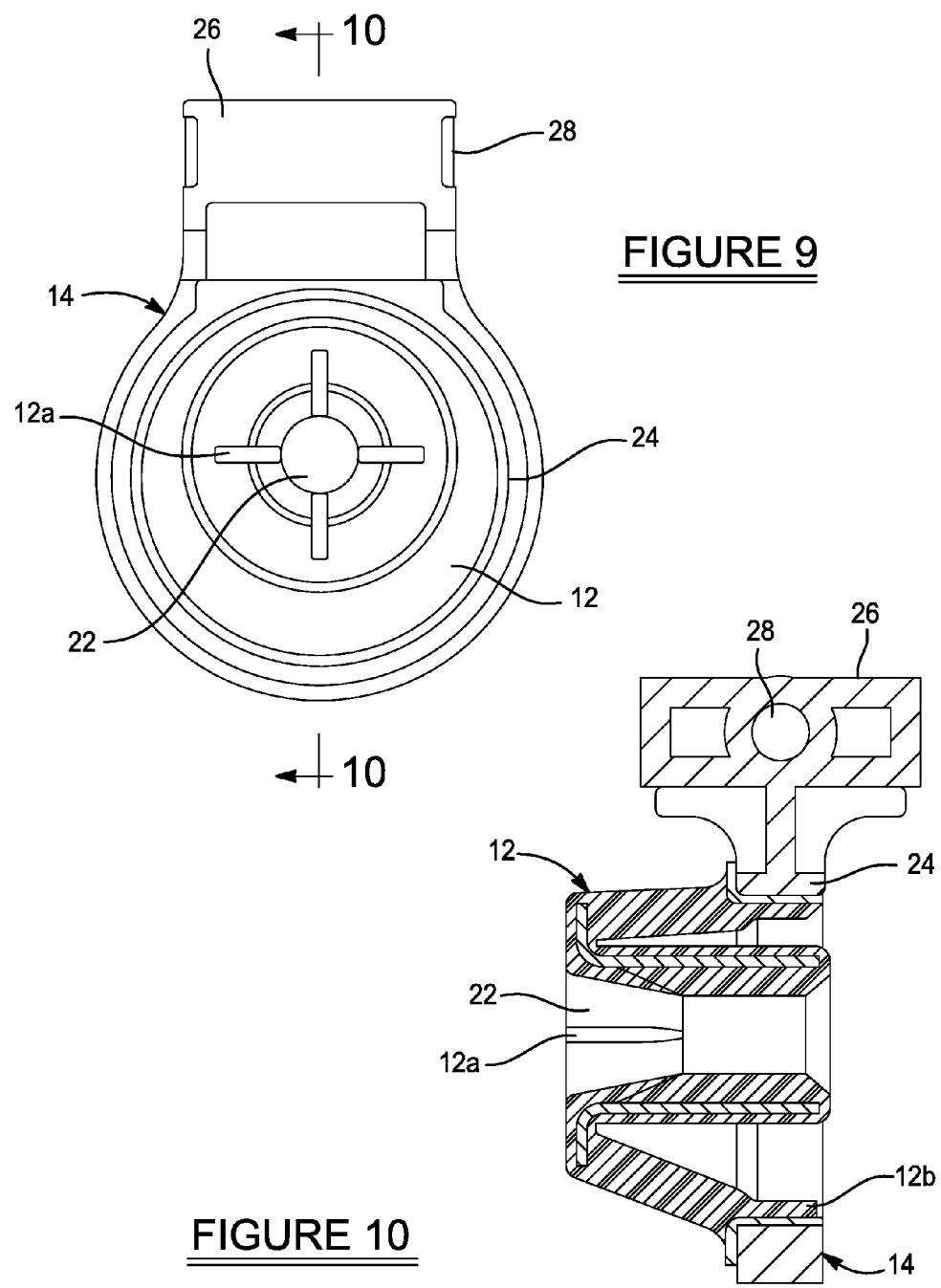

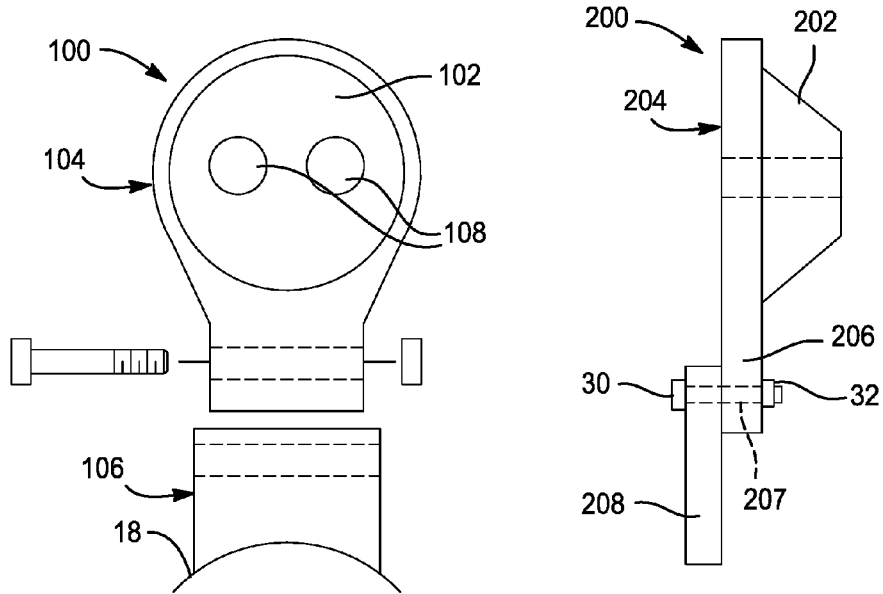
FIGURE 12
FIGURE 13
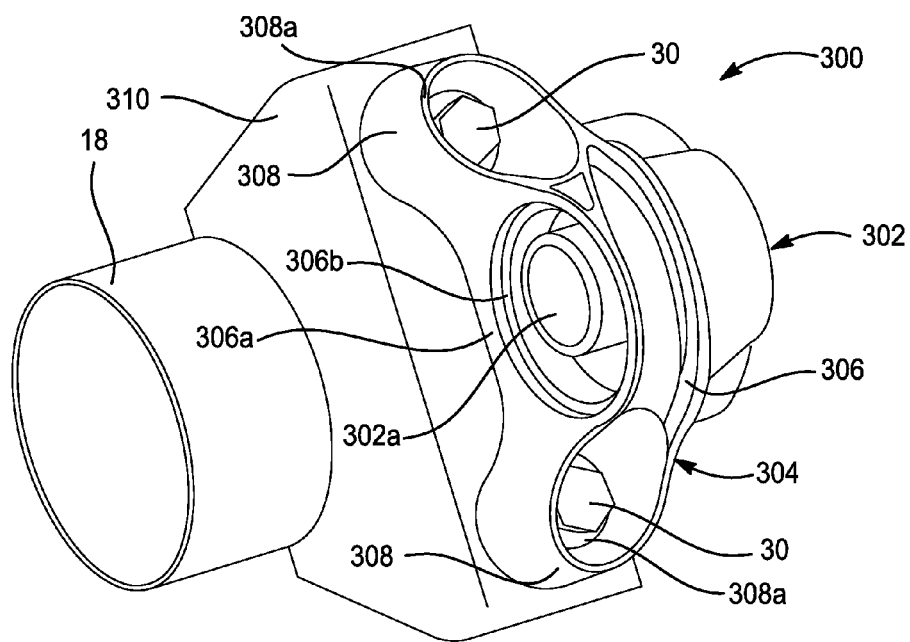
FIGURE 14

SOCKET ISOLATOR MOUNTING APPARATUS

CROSS-REFERENCE TO RELATED APPLICATIONS

This application is a continuation of U.S. patent application Ser. No. 14/678,377, filed Apr. 3, 2015, which claims the benefit of U.S. Provisional Patent Application No. 62/046,418 filed Sep. 5, 2014. The entire disclosures of the above applications are incorporated herein by reference.

FIELD

The present disclosure relates to mounting apparatuses for motor vehicle exhaust systems, and more particularly to an exhaust system isolator apparatus which reduces or eliminates the need for multiple hangers to be fixedly secured to a portion of the vehicle body.

BACKGROUND

The statements in this section merely provide background information related to the present disclosure and may not constitute prior art.

Many configurations of hanger devices have been developed for mounting and orienting an isolator, used to isolate an exhaust component of a motor vehicle, to a portion of a vehicle body. Traditionally, single hole isolators have required mounting to some sufficiently stiff and rigid portion of the vehicle body through the use of a hanger, as shown in FIG. 1. Typically the isolator support bracket having a rubber isolator element mounted therein is bolted using one or more threaded bolts to a selected portion of the vehicle body. A separate hanger, typically welded to the exhaust component, has a distal end thereof pushed through a hole in the rubber isolator element. The length of the hanger also to be sufficiently long to provide space the rubber isolator element far enough from the exhaust component so that the rubber isolator element is not damaged by the heat from the exhaust component. This mounting configuration has the drawback of necessitating that the vehicle manufacturer designate a specific portion of the vehicle body that provides sufficient area, strength and stiffness to accommodate the required mounting bracket and threaded bolt(s). This has proven to be challenging with some vehicles. Other well known forms of isolators, such as shown in FIG. 2A, require multiple hangers. Each isolator shown in FIG. 2A requires two independent hangers, one fixedly secured (e.g., by welding) to the exhaust structure and the other fixedly secured (e.g., by welding) to a body portion of the vehicle. The system of FIG. 2 thus requires a total of four independent hangers for its use. FIG. 2B shows a prior art hanger configuration where a pair of hangers and a corresponding pair of brackets were required to achieve the needed degree of modal stiffness and strength, when supporting an exhaust component.

Conventional two hole isolators lack travel control and durability compared to single hole isolator designs. Three and four hole isolator designs require multiple inefficient heavy hangers, along with the time and labor required to install the required hangers on the vehicle body itself. Three and four hole isolator designs also typically provide less than optimal durability compared to bolt-to-body designs (i.e., as shown in FIG. 1). The need for providing two or more holes in the isolator can reduce its strength and durability.

SUMMARY

In one aspect the present disclosure relates to an isolator mounting apparatus for supporting an exhaust component from a body portion of a vehicle via a hanger comprises an elastomeric isolator element having at least one aperture for receiving a portion of the hanger. An isolator bracket for receiving and supporting the isolator element includes a neck portion extending therefrom. A mounting element includes a pair of flanges. The flanges are secured to the isolator bracket with a fastener extending along longitudinal axis. The flanges engage the neck portion and prevent rotation of the isolator bracket about the longitudinal axis.

In another aspect the present disclosure relates to an isolator mounting apparatus for supporting an exhaust component from a body portion of a vehicle via a hanger. The apparatus may comprise an elastomeric isolator element having at least one hole for receiving an end of the hanger, and an isolator bracket. The isolator bracket may receive and support the elastomeric isolator element. The isolator bracket may include a frame portion having a pair of flanges each having a hole therein and a portion having a hole for receiving the elastomeric isolator element. The holes in the flanges are adapted to receive portions of fastening components to enable the flanges to be secured to the exhaust component.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 9 is a front view of just the isolator bracket with the elastomeric isolator element mounted therein;

FIG. 10 is a cross sectional view of the assembly of FIG. 9 taken in accordance with section line A-A in FIG. 9;

FIG. 12 is a front view of still another embodiment of an isolator mounting apparatus in accordance with the present disclosure which has hanger holes to accommodate two hangers to enable the apparatus to be suspended from a vehicle body portion, while a neck portion thereof can be secured via a "tube-to-socket" connection;

FIG. 13 is a side view of another embodiment of an isolator mounting apparatus in accordance with the present disclose in which the neck portion of the isolator bracket can be secured to a hanger via a lap joint;

FIG. 14 is a perspective view of still another embodiment of an isolator mounting apparatus of the present disclosure in which the isolator bracket includes a pair of integrally formed flanges that allow two points of attachment to a U-shaped bracket commonly used with exhaust components;

DETAILED DESCRIPTION

Figure 1:
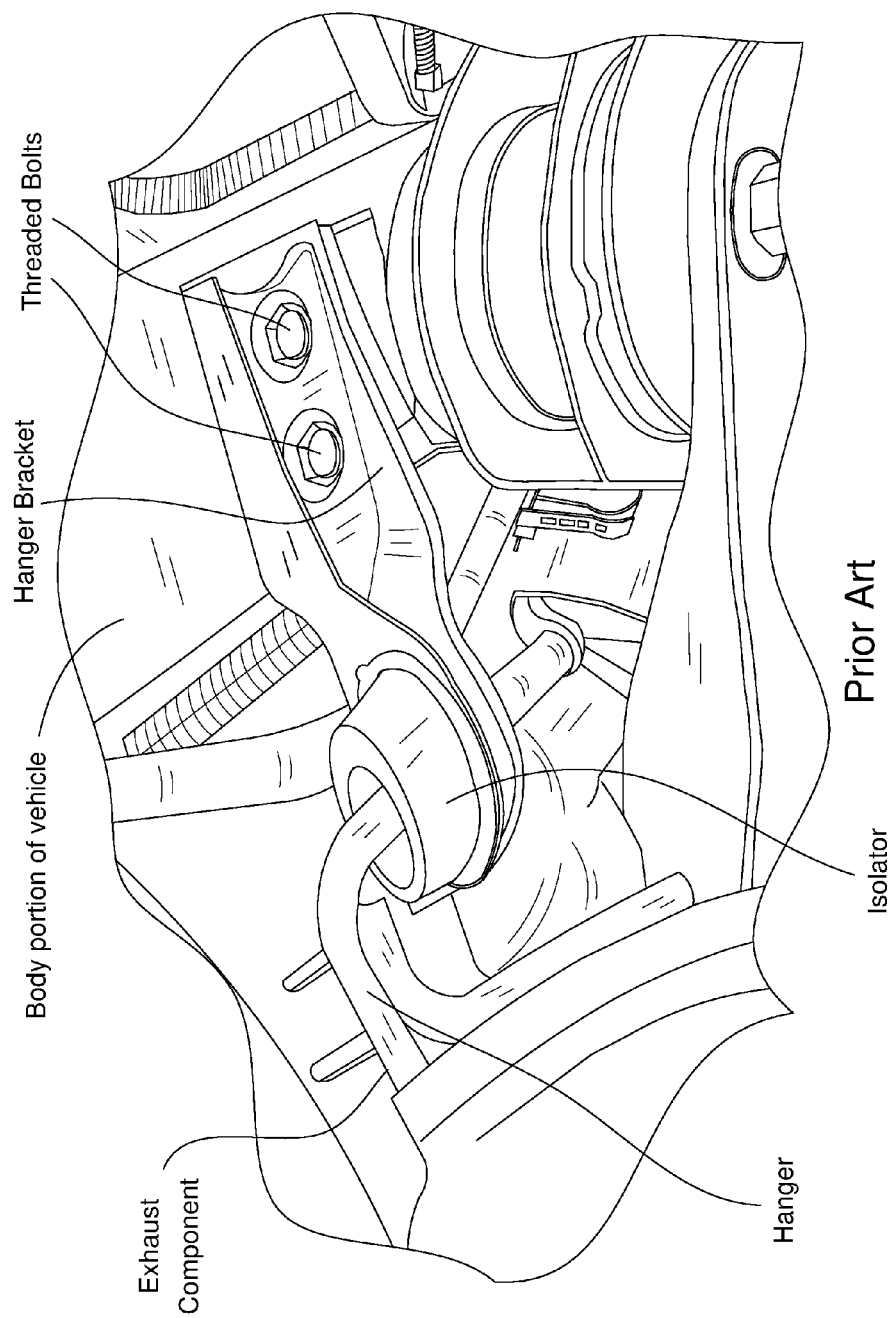
FIG. 1 is an illustration of a prior art, single hole, bolt-to-body isolator system.
Figure 2A:
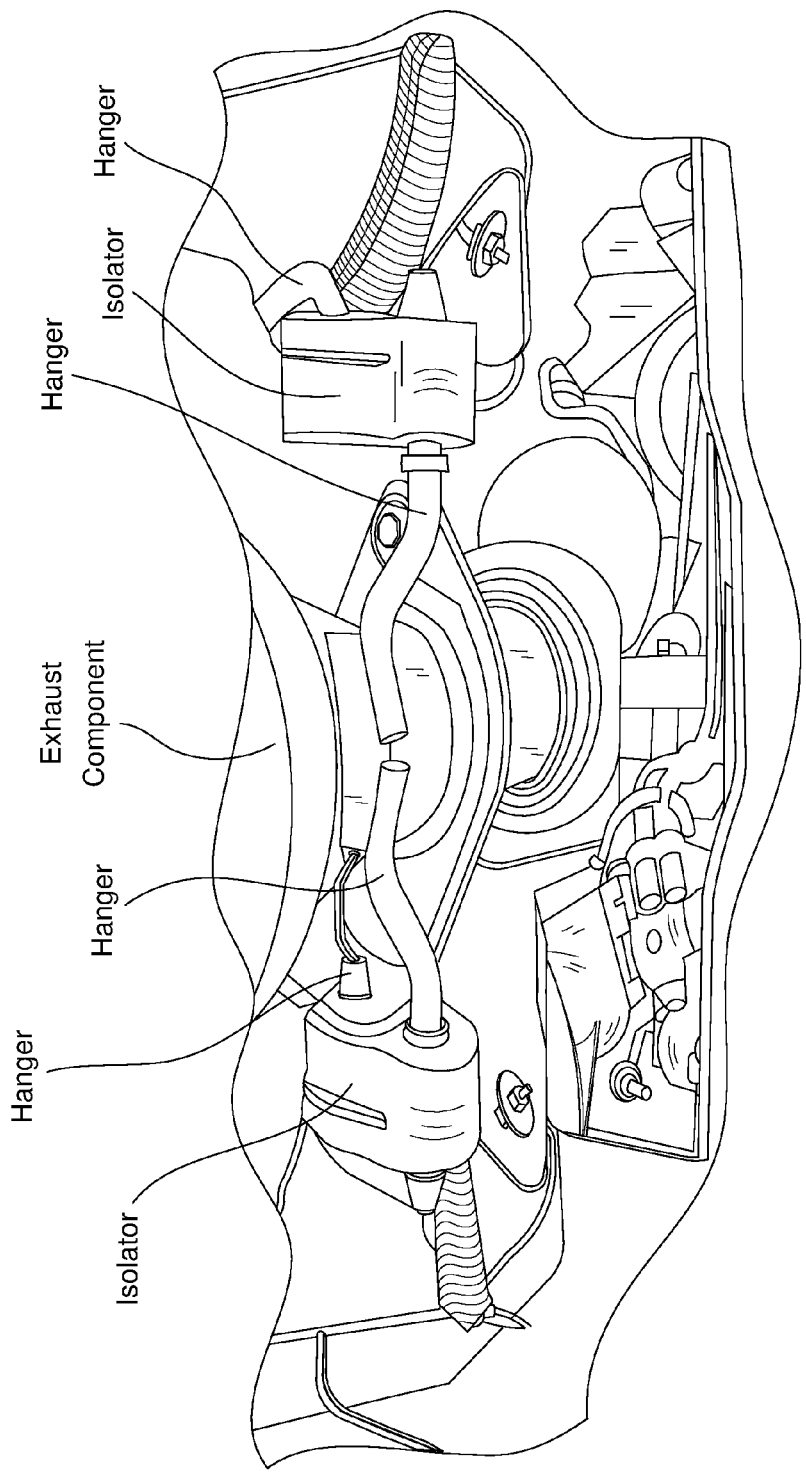
FIG. 2A is an illustration of a pair of prior art isolators which require two hangers to be used with each isolator, one hanger fixedly secured to an exhaust component and the other fixedly secured to a portion of the vehicle body.
Figure 2B:
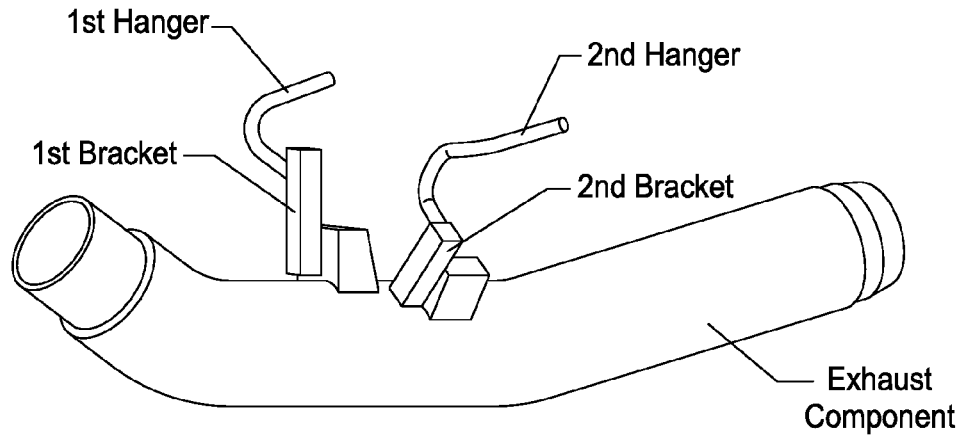
FIG. 2B is an illustration of a prior art configuration for supporting an exhaust component which requires the use of two hangers and two brackets to achieve a desired degree of modal strength, stiffness and positional tolerance, with a required long hanger reach to achieve sufficient thermal clearance for the isolator element (not shown)

The following description is merely exemplary in nature and is not intended to limit the present disclosure, application, or uses. It should be understood that throughout the drawings, corresponding reference numerals indicate like or corresponding parts and features.

Figure 3:
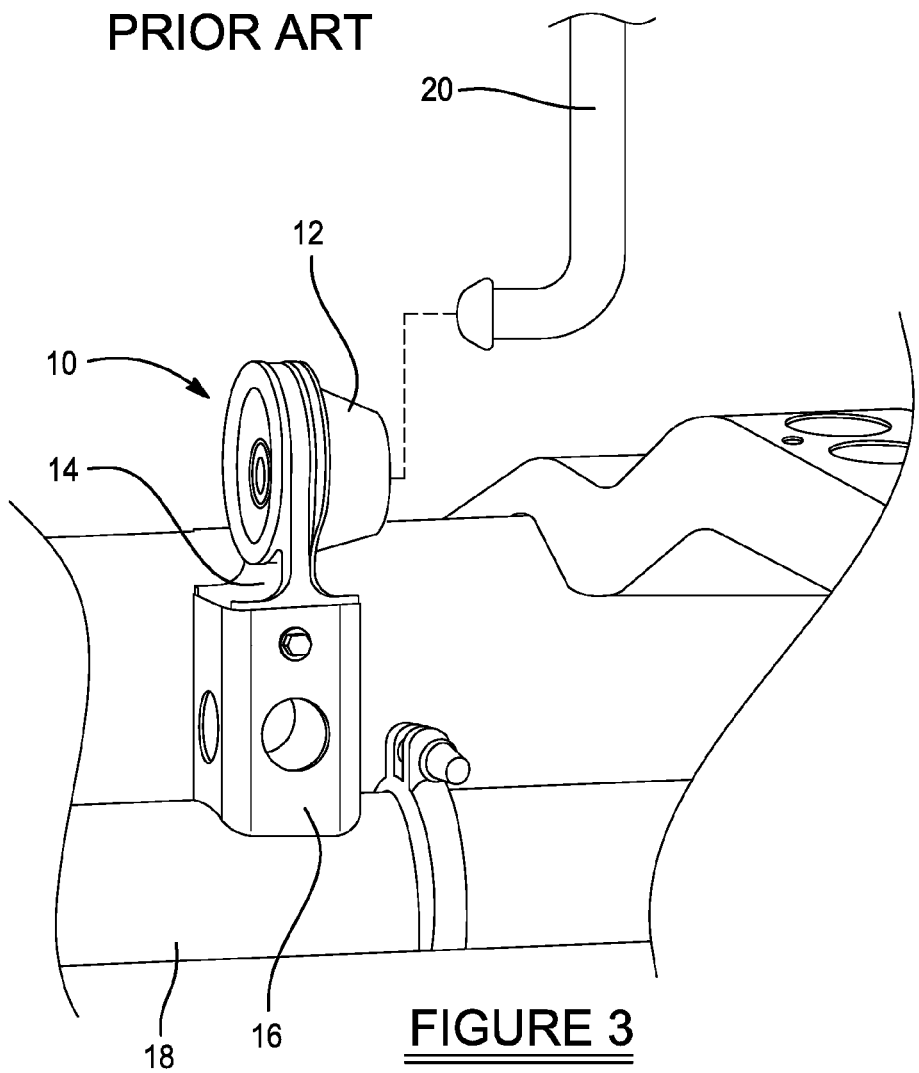
FIG. 3 is a perspective view of one embodiment of an isolator mounting apparatus in accordance with the present disclosure.

Referring to FIG. 3 there is shown an isolator mounting apparatus 10 (hereinafter simply "apparatus 10") in accordance with one embodiment of the present disclosure. The apparatus 10 in this example includes an elastomeric isolator element 12, an isolator bracket 14 in which the isolator element 12 is mounted, and an independent mounting element 16. In this embodiment the mounting element 16 is formed by a bracket, and will be referred to throughout as "mounting bracket 16".

The mounting bracket 16 is fixedly secured, such as by welding, to an outer surface of a tubular exhaust component 18 of a motor vehicle (not shown). One end of an independent hanger 20 may be press fit through a hole 22 in the isolator element 12 to thus be frictionally secured to the isolator element. The other end of the hanger 20 is secured to a portion of the vehicle body. In this example the hanger 20 does not form part of the apparatus 10.

Figure 4:
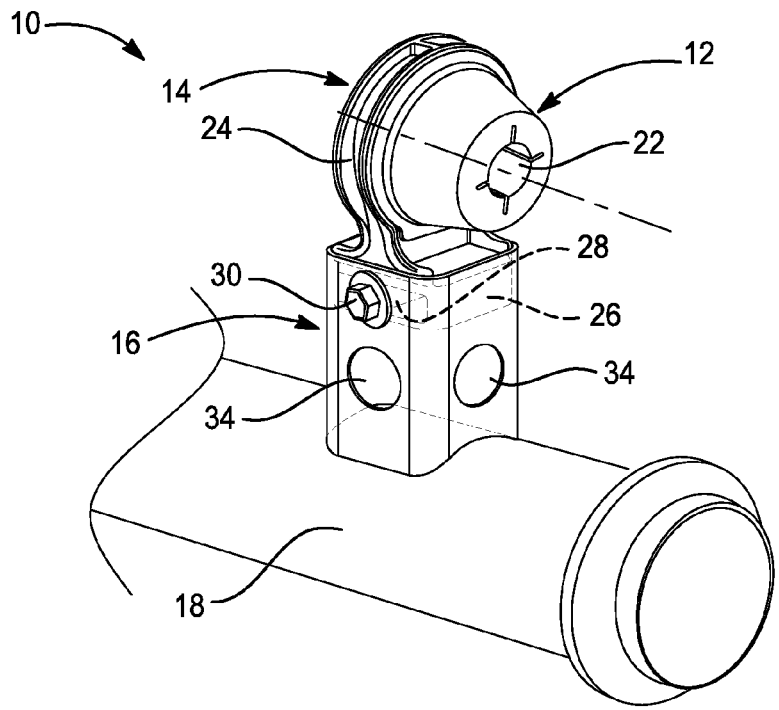
FIG. 4 is an enlarged perspective view of the isolator mounting apparatus of FIG. 3 with just a portion of an exhaust component being shown.
Figure 5:
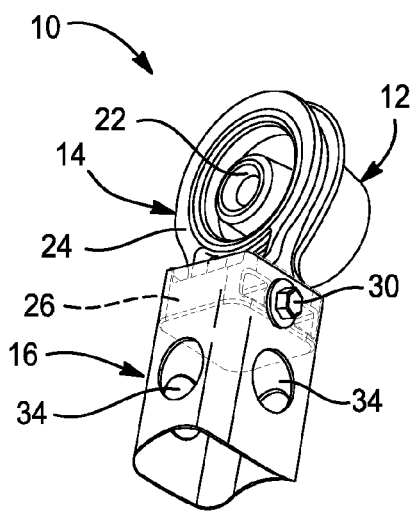
FIG. 5 is a rear perspective view of the isolator mounting apparatus detached from the exhaust component.
Figure 6:
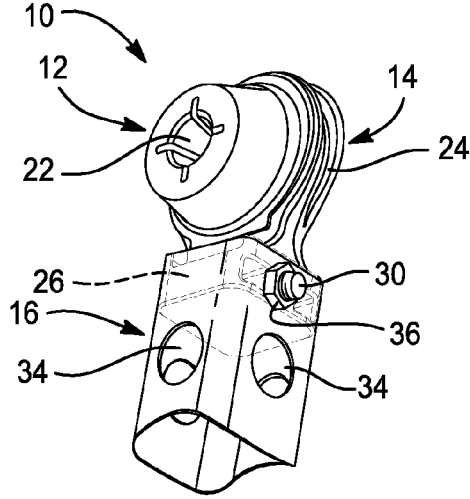
FIG. 6 is a front perspective view of the apparatus of FIG. 5.
Figure 7:
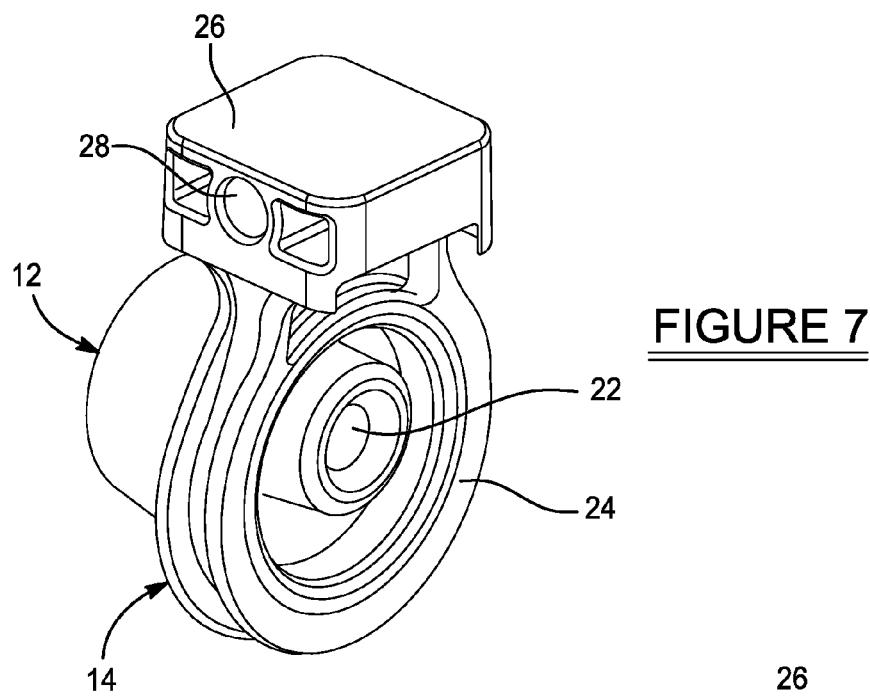
FIG. 7 is a rear perspective view of just the isolator bracket with the elastomeric isolator element mounted therein.
Figure 8:
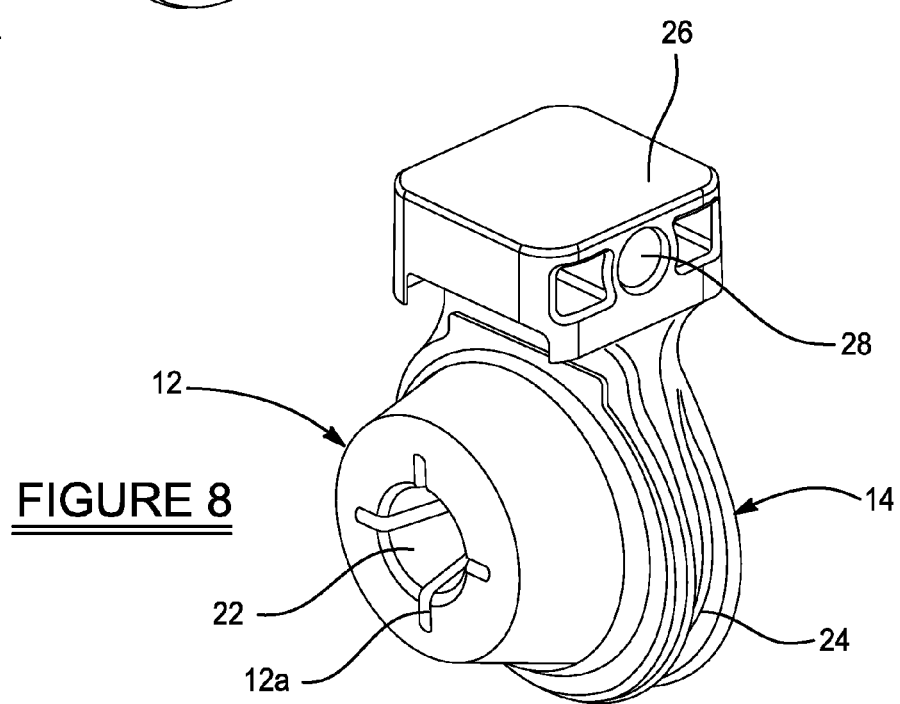
FIG. 8 is a front perspective view of the assembly of FIG. 7.

Referring to FIGS. 4-6, the apparatus 10 can be seen in greater detail. The isolator bracket 14 may include a circumferential frame portion 24 into which a portion of the isolator element 12 is mounted with a press fit, frictional attachment. A neck portion 26 of the isolator bracket 14 maybe integrally formed with the circumferential frame portion 24 so that the isolator bracket 14 forms a single piece component. Alternatively, the circumferential frame portion 24 and the neck portion 26 could be formed as separate components and secured together via a suitable fastener. In this example the neck portion 26 has a square shape and is telescopically engaged (i.e., a "tube-to-socket" connection) with an open end of the mounting bracket 16. The mounting bracket 16 is fixedly attached such as by welds to the exhaust component 18 (shown in FIG. 4). The neck portion 26 of the isolator bracket 14 also includes a through bore 28 which is aligned with a pair of holes in the mounting bracket 16 (not visible in FIG. 3). A threaded bolt 30 is inserted through the holes in both the mounting bracket 16 and the through bore 28 of the neck portion 26. A mating threaded nut 36 (FIG. 6) is attached to the distal end of the threaded bolt 30 and thus helps to secure the neck portion 26 of the isolator bracket 14 to the mounting bracket 16. The threaded nut 36 may be welded to the mounting bracket 16 or it may be an independent component that is held stationary with a suitable tool while the threaded bolt 30 is being tightened. The orientation of the threaded bolt 30 along a plane perpendicular to the hole 22 in the isolator element 12 optimizes support to handle the radial loading experienced by the isolator element. Optionally, two or more threaded bolts 30 arranged either parallel to or perpendicular to each other, or perpendicular to a longitudinal axis extending through the hole 22, could be used depending on the needs of a specific application.

The mounting bracket 16 may also include one or more holes 34 to remove weight, to help promote air circulation and reduce the heat conduction path though the mounting bracket to aid in dissipating heat. While the mounting bracket 16 is shown as having a square shape, it will be appreciated that other shapes such as circular, rectangular, etc. could be used just as well. The specific cross sectional shape selected for the mounting bracket 16 will dictate the cross sectional shape and dimensions of the neck portion 26 of the isolator bracket 14 (or vice versa). The mounting bracket 16 in one example is formed from stainless steel, while the isolator bracket 14 may be formed from stainless steel, low carbon steel or another metal such as aluminum. Aluminum is preferable from a weight standpoint. However, if an aluminum isolator bracket 14 is coupled to a stainless steel mounting bracket 16, then to avoid galvanic concerns it is preferred that either the aluminum isolator bracket 14 be electrically coated, or that the stainless steel mounting bracket 16 be black painted after welding, as is common on muffler black-outing. The slip fit, telescopic attachment (i.e., "tube-to-socket" connection) of the neck portion 26 with the mounting bracket 16 provides significant added structural strength and rigidity, as well as largely eliminating any issues that might arise with mismatched thermal growth between the two components 26 and 16. The slip fit connection of the isolator bracket 14 to the mounting bracket 16 also facilitates improved serviceably of the apparatus 10. The tubular construction of the mounting bracket 16 forms an efficient structure that also provides excellent modal stiffness and strength for the isolator bracket 14 to mount on to. The length provided by the mounting bracket 16 also forms a longer conduction path to better dissipate the heat from the exhaust component 18, which in turn reduces the heat that reaches the isolator bracket 14, and thus the heat that reaches the elastomeric isolator element 12. This helps to prolong the life of the elastomeric isolator element 12.

The circumferential frame portion 24 provides the benefit of also helping to dissipate heat from the exhaust component 18 to the ambient environment. This may also help to improve the longevity of the elastomeric isolator element 12. And while the circumferential frame portion 24 is shown with a circular shape, it will be appreciate that the shape selected for the isolator element 12 will largely dictate the shape of the circumferential frame portion 24 (or vice versa).

FIGS. 7-10 illustrate just the isolator bracket 14 with the isolator element 12 mounted therein. In this example the isolator element 12 may include a plurality of groove portions 12a, visible in FIGS. 8, 9, and 10 which aid in easing insertion of a distal end of a hanger through the isolator element 12. The isolator element 12 also includes a flange 12b which fits within the circumferential frame portion 24 of the isolator bracket 14 and helps to maintain the isolator element 12 secured to the isolator bracket 14.

Figure 11:
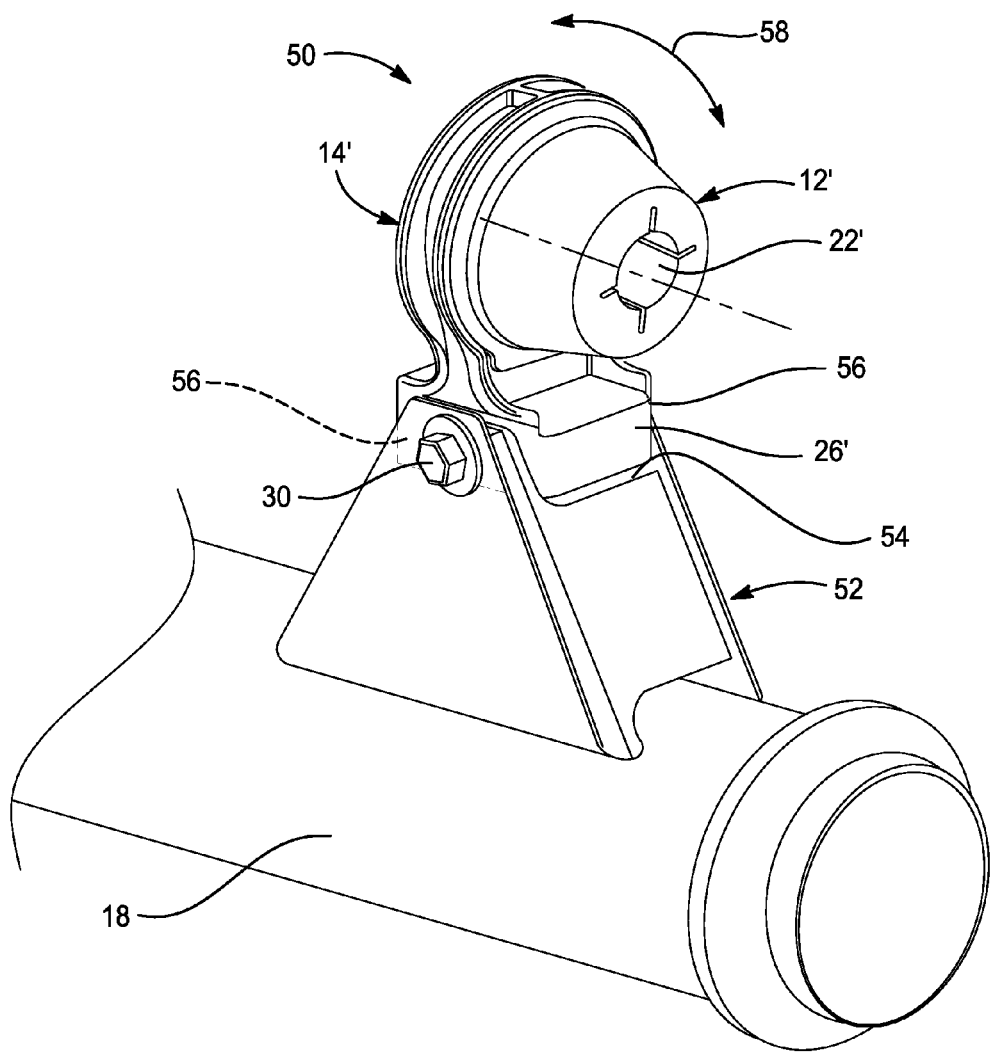
FIG. 11 is a perspective view of another embodiment of an isolator mounting apparatus in accordance with the present disclosure.

Referring to FIG. 11, an isolator mounting apparatus 50 is shown in accordance with another embodiment of the present disclosure. The apparatus 50 in this example includes an isolator component 12' having a hole 22', and an isolator bracket 14', which are identical in construction to the isolator element 12 and isolator bracket 14. However, a mounting bracket 52 is incorporated which is different from the mounting bracket 16. Mounting bracket 52 is secured to the isolator bracket 14' via threaded bolt 30 and a threaded nut (the nut being not visible in the figure). The mounting bracket 52 includes a notched section 54 which helps to form parallel projecting arm portions 56, and thus a clevis-like structure to which a base portion 26' of the isolator bracket 14' can be secured. And although it is anticipated that in most applications, a degree of adjustability will not be needed or desired, the clevis-like structure may be utilized to provide a small degree of angular adjustability of the isolator bracket 14' about arc line 58. If no angular adjustability is desired, then the mounting bracket 52 may be formed such that the dimension of the notched section 54 allows insertion of the base portion 26' but with virtually no angular play.

FIG. 12 shows still another isolator mounting apparatus 100 which is similar to the apparatus 10 and includes an elastomeric isolator element 102, an isolator bracket 104 and a mounting bracket 106. The isolator bracket 104 and the mounting bracket 106 are identical to components 14 and 16, respectively, but the isolator element 102 includes a pair of holes 108 formed therein instead of just one hole. This configuration may be helpful in the event that one wishes to use a pair of hangers to engage the isolator element 102 rather than just a single hanger. The use of a pair of hangers may be desirable in some applications where one wishes to provide even better lateral stability of the components being supported from the apparatus 100. It will also be understood that the clevis-like mounting bracket 52 shown in FIG. 7 could also be incorporated into the apparatus 100 if desired.

Still another embodiment 200 of the present disclosure is shown in FIG. 13 and may make use of an elastomeric isolator element 202 mounted within an isolator bracket 204, with the isolator bracket having a neck portion 206. The neck portion 206 may have a hole 207 and be attached via a lap joint to a portion of a hanger 208 using the threaded bolt 30 and threaded nut 32.

FIG. 14 shows an isolator mounting apparatus 300 in accordance with still another embodiment of the present disclosure. The apparatus 300 in this example includes an elastomeric isolator element 302 which is mounted in a press fit, frictional fashion in an isolator bracket 304. The isolator bracket 304 includes a frame portion 306 having a pair of flanges 308 extending in opposite directions and being oriented to both lay generally flat along a flat surface. A central portion 306a of the frame portion 306 includes a hole 306b within which the elastomeric isolator element 302 may be inserted in a press fit, frictional manner. The central portion 306a in this example is generally longitudinally aligned between the two flanges 308, and further such that it is at a midpoint between the two flanges. The elastomeric isolator element 302 includes a hole 302a for receiving an independent hanger (not shown). The flanges 308 each include holes 308a which allow a pair of threaded bolts 30 to extend through the flanges and secure the isolator bracket 304 to a U-shaped bracket 310, which may in turn be fixedly secured such as by welding to the exhaust component 18. Alternatively, a U-shaped muffler bolt with threaded ends could be used instead of separate threaded bolts 30, along with separate threaded nuts, that secure the flanges 308 against the U-shaped bracket 310. The use of two attachment points on the U-shaped bracket 310 provides an even higher degree of attachment strength and enables quick and easy attachment of the apparatus 300 to conventional U-shaped brackets commonly used with vehicle exhaust system components.

Figure 15:
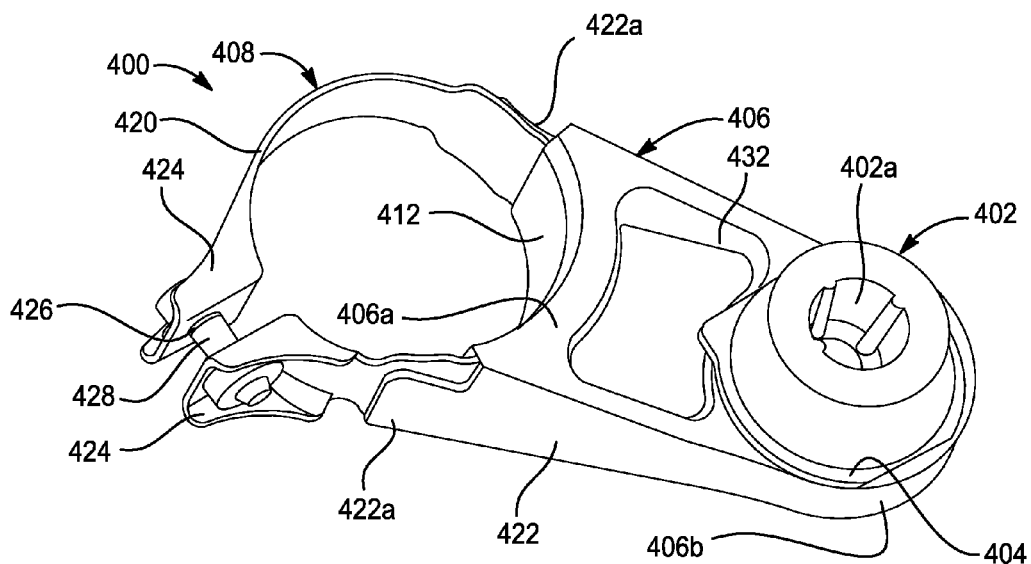
FIG. 15 is a front perspective view of an isolator mounting apparatus in accordance with another embodiment of the present disclosure.
Figure 16:
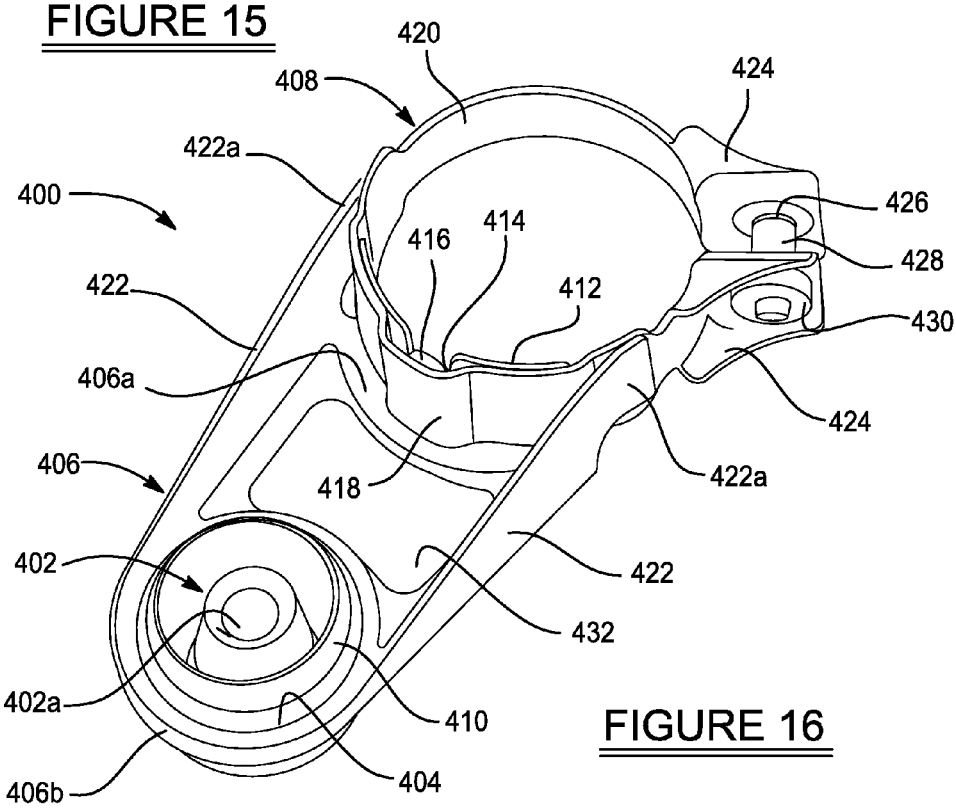
FIG. 16 is a rear perspective view of the apparatus of FIG. 15.

Referring to FIGS. 15 and 16, an isolator mounting apparatus 400 in accordance with still another embodiment of the present disclosure is disclosed. The apparatus 400 includes an elastomeric isolator element 402 having a hole 402a, a mounting plate 404, an isolator bracket 406 having a neck portion 406a and a circumferential frame portion 406b, and a mounting element 408. In this embodiment the mounting element 408 forms a clamp, and will be referred to throughout as "mounting clamp 408". The elastomeric isolator element 402 may be bonded to the mounting plate 404, and then the mounting plate 404 with the element 402 bonded thereto may be inserted, such as by a press-fit frictional attachment, within a hole 410 in the circumferential frame portion 406b of the isolator bracket 406. The mounting plate 404 may be made from plastic, aluminum, steel or any other suitably strong material. As shown in FIG. 16, the isolator bracket 406 includes a flange 412 having a notch 414. The mounting clamp 408 includes a boss portion 416 fixedly secured thereto such as by welding or via an external fastening element at an offset portion 418 of a band portion 420 of the mounting clamp 408. The band portion 420 fits into a pair of slots formed between opposite edges of the flange 412 and distal ends 422a of the sidewalls 422 of the isolator bracket 406. Once the mounting clamp 408 is inserted into the pair of slots, the engagement of the boss portion 416 in the notch 414 prevents the band portion 420 from rotating relative to the isolator bracket 406 as the mounting clamp 408 is tightened. The mounting clamp 408 also includes facing flanges 424 with holes 426 which allow an external threaded bolt 428 and nut 430 to be used to secure the mounting clamp around a tubular exhaust component (not shown).

The isolator bracket 406 may also optionally, but preferably, include an opening 432 which reduces the weight of the apparatus 400 as well as promotes airflow in the vicinity of the elastomeric isolator element 402. The isolator bracket 406 may be made from any suitably strong and durable material such as stainless steel or aluminum. The mounting clamp 408 is preferably made from stainless steel. An important advantage of the apparatus 400 is the ability to disassemble the mounting clamp 408 from the isolator bracket 406. This adds significantly to the serviceability of the apparatus 400.

Figure 17:
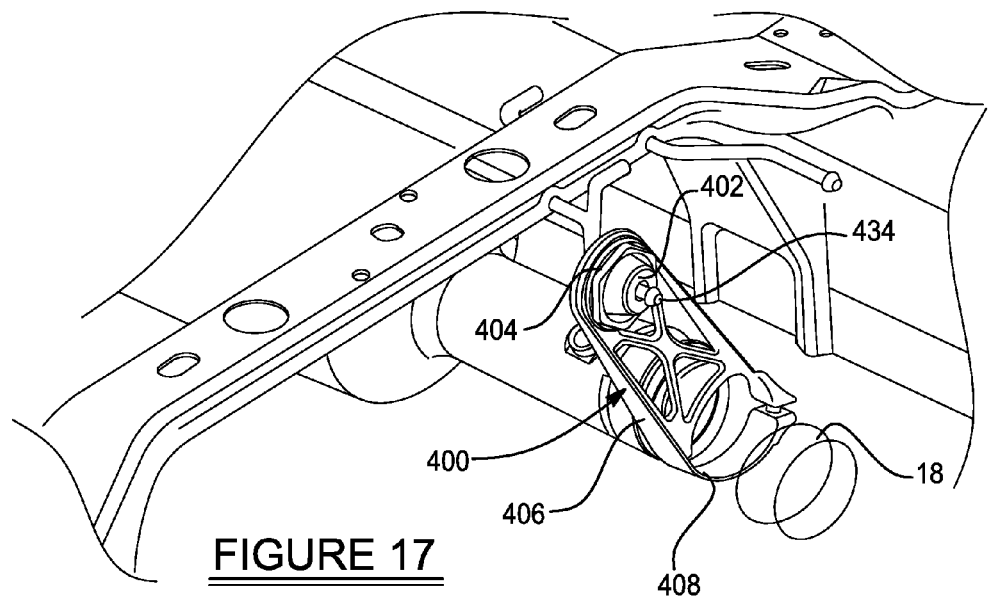
FIG. 17 is a perspective view showing the isolator mounting apparatus of FIG. 15 being used to support an exhaust component therefrom.

FIG. 17 shows the apparatus 400 secured to the exhaust component 18 using the mounting clamp 408. The elastomeric isolator element 402 receives a distal end of an external hanger 434. The apparatus 400 eliminates the need to weld a separate hanger to the exhaust component 18. The mounting clamp 408 also provides the advantage of accommodating tubular exhaust components having slightly differing diameters, and is therefore not limited to use with exhaust components having only one specific diameter.

Figure 18:
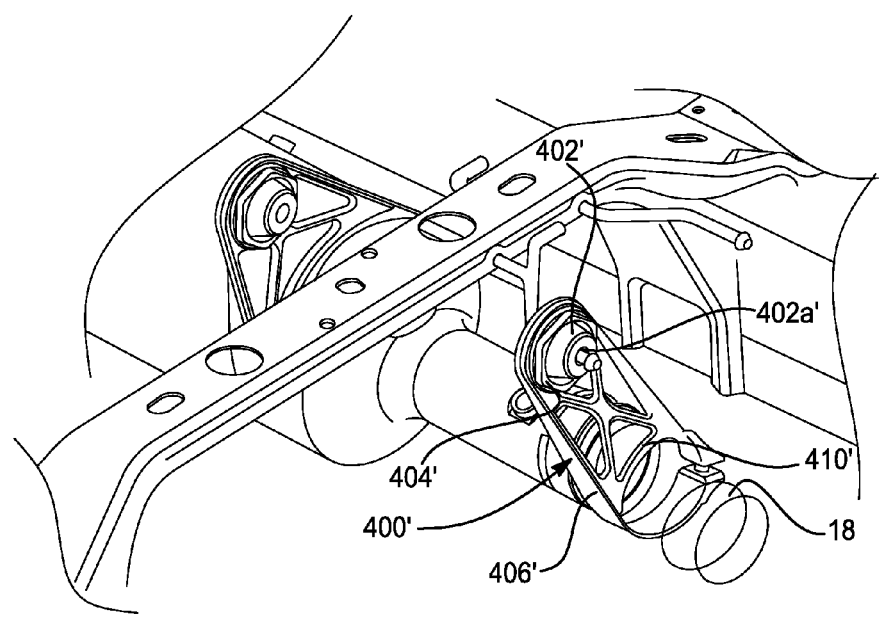
FIG. 18 is a perspective view showing a modified version of the isolator mounting apparatus of FIG. 15, which may be fixedly secured, such as by welding, to an exhaust component, to thus eliminate the use of a threaded bolt and nut.

Referring to FIG. 18, an isolator mounting apparatus 400' is shown secured directly to the exhaust component such as by welding. The apparatus 400' is similar to the apparatus 400 but does not include the mounting clamp 408, because of its intent to be secured directly to the exhaust component, such as by welding. Thus, the apparatus 400' only includes an elastomeric isolator element 402' having a hole 402a', a mounting plate 404' and an isolator bracket 406' in which the mounting plate 404' and elastomeric isolator element 402' are mounted. The isolator bracket 406' in this embodiment may include a plurality of openings 410' for promoting airflow around various portions of the isolator bracket.

Figure 19:
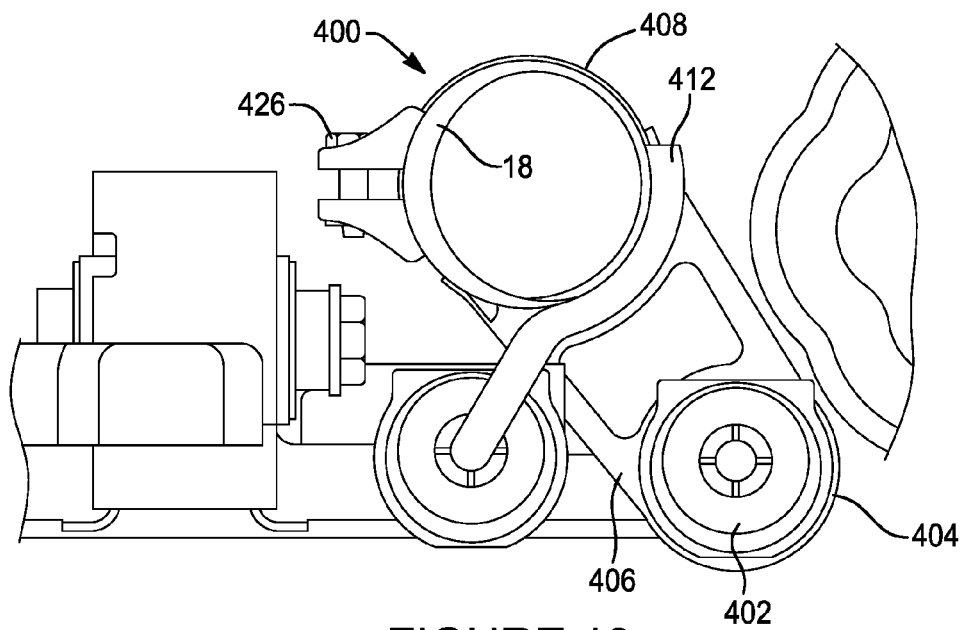
FIGS. 19 and 20 are end and plan views, respectively, of the apparatus of FIG. 15 illustrating another possible attachment configuration where the apparatus includes a hanger welded thereto, in addition to its clamp on mounting bracket, and thus enables the apparatus to be attached to a tubular exhaust component as well as to an independent isolator attachment point.
Figure 20:
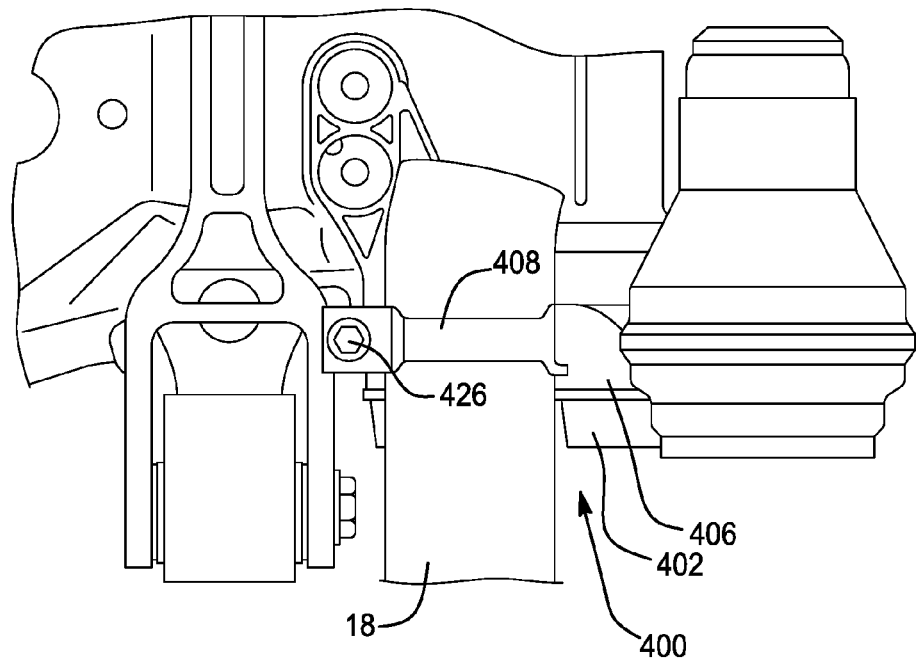

FIGS. 19 and 20 show another example of the isolator bracket 406 of the apparatus 400' being attached such as by welding to an independent hanger 412, while the mounting clamp 408 is secured around the exhaust component 18.

The various embodiments disclosed herein all enable an exhaust component to be secured to a vehicle body portion using only a single hanger secured to the body portion. The mounting brackets of the various embodiments all serve to more efficiently conduct and dissipate heat from the exhaust component, which can help to prolong the life of the elastomeric isolator element. Supporting the elastomeric isolator element from a circumferential frame portion of the isolator bracket provides added stiffness and strength and also helps to dissipate heat before the heat reaches the elastomeric isolator element. The various embodiments disclosed herein all provide enhanced serviceability as compared to prior art isolator bracket designs.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An isolator mounting apparatus for supporting an exhaust component from a body portion of a vehicle via a hanger, the isolator mounting apparatus comprising:
    an elastomeric isolator element having at least one aperture for receiving a portion of the hanger;
    an isolator bracket for receiving and supporting the isolator element, the isolator bracket including a neck portion extending therefrom; and
    a mounting element including a pair of flanges interconnected by a wall, the flanges of the mounting element being secured to the isolator bracket with a fastener extending along a longitudinal axis, wherein the flanges engage the neck portion and prevent rotation of the isolator bracket about the longitudinal axis, the wall including a first aperture through which the fastener extends.

2. The isolator mounting apparatus of claim 1, wherein the mounting element includes a second aperture aligned with the first aperture through which the fastener extends.

3. The isolator mounting apparatus of claim 1, wherein the neck portion includes a through bore in receipt of the fastener, the through bore being aligned with the first and second apertures.

4. The isolator mounting apparatus of claim 1, wherein the neck portion is shaped to complement the shape and relative position of the flanges such that rotation of the isolator bracket about an axis perpendicular to the longitudinal axis is prevented.

5. The isolator mounting apparatus of claim 1, wherein the fastener includes a threaded bolt threadably engaged with a nut.

6. The isolator mounting apparatus of claim 1, wherein the aperture of the elastomeric isolator element defines a hanger axis, the longitudinal axis and the hanger axis extending perpendicular to each other.

7. The isolator mounting apparatus of claim 1, wherein the exhaust component is adapted to carry exhaust along an exhaust flow axis, the exhaust flow axis extending perpendicular to the longitudinal axis.

8. An isolator mounting apparatus for supporting an exhaust component from a body portion of a vehicle via a hanger, the apparatus comprising:
    an elastomeric isolator element having at least one aperture for receiving an end of the hanger;
    an isolator bracket for receiving and supporting the isolator element, the isolator bracket including a neck portion extending therefrom; and
    a mounting element including spaced apart walls extending parallel to one another, wherein the neck portion is positioned between the walls and secured to the mounting element with a fastener including a longitudinal axis extending parallel to the walls, wherein the walls prevent rotation of the isolator bracket about the longitudinal axis, wherein the mounting element includes another wall interconnecting the spaced apart walls, a first aperture extending through the another wall and being in receipt of the fastener.

9. The isolator mounting apparatus of claim 8, wherein the mounting element includes a second aperture aligned with the first aperture through which the fastener extends.

10. The isolator mounting apparatus of claim 9, wherein the neck portion includes a through bore in receipt of the fastener, the through bore being aligned with the first and second apertures.

11. The isolator mounting apparatus of claim 8, wherein the neck portion is shaped to complement the shape and relative position of the spaced apart walls such that rotation of the isolator bracket about an axis perpendicular to the longitudinal axis is prevented.

12. The isolator mounting apparatus of claim 8, wherein the fastener includes a threaded bolt threadably engaged with a nut.

13. The isolator mounting apparatus of claim 8, wherein the aperture of the elastomeric isolator element defines a hanger axis, the longitudinal axis and the hanger axis extending perpendicular to each other.

14. The isolator mounting apparatus of claim 8, wherein the exhaust component is adapted to carry exhaust along an exhaust flow axis, the exhaust flow axis extending perpendicular to the longitudinal axis.

15. An isolator mounting apparatus for supporting an exhaust component from a body portion of a vehicle via a hanger, the isolator mounting apparatus comprising:

an isolator bracket for receiving and supporting the isolator element, the isolator bracket including a neck portion extending therefrom, the neck portion including a first outer surface and a second outer surface; and a mounting element including a first flange configured to extend parallel to the first outer surface, the first flange of the mounting element being secured to the isolator bracket with a fastening component, wherein the first flange prevents rotation of the isolator bracket relative to the mounting element, wherein the mounting element is shaped as a socket having an inner wall shaped to complement an outer shape of the isolator bracket to further restrict rotation of the isolator bracket relative to the mounting element.

16. The isolator mounting apparatus of claim 15, wherein the mounting element includes first and second aligned apertures through which the fastening component extends.

17. The isolator mounting apparatus of claim 16, wherein the neck portion includes a through bore in receipt of the fastening component, the through bore being aligned with the first and second apertures.

\* \* \* \* \*